United States Patent

Nakayama

[11] 3,927,712
[45] Dec. 23, 1975

[54] ELECTRONIC CONTROL SYSTEM OF AN AIR CONDITIONING APPARATUS

[75] Inventor: Hiroshi Nakayama, Shizuoka, Japan

[73] Assignee: Iwatani & Co., Ltd., Osaka, Japan

[22] Filed: Oct. 11, 1974

[21] Appl. No.: 514,179

[52] U.S. Cl. .................... 165/12; 62/93; 62/180; 62/231
[51] Int. Cl.² ........................................ F25D 29/00
[58] Field of Search ............... 62/231, 93, 158, 163; 165/12

[56] References Cited
UNITED STATES PATENTS 3,636,369   1/1972   Harter .............................. 62/158
3,864,611   2/1975   Chang .............................. 62/158

Primary Examiner—William E. Wayner
Attorney, Agent, or Firm—David A. Blumenthal

[57] ABSTRACT

An electronic control system for an air conditioning apparatus comprising hand-operated cooling and drying switches, a compressor starting timer, a temperature regulating circuit, a dehydration timer, and a fan control cirucit. The temperature regulating circuit includes a hand-operated variable resistor to preset temperatures as desired; the temperature regulating circuit controls the compressor starting timer; and the dehydration timer controls the compressor starting timer and the temperature regulating circuit.

8 Claims, 3 Drawing Figures

ELECTRONIC CONTROL SYSTEM OF AN AIR CONDITIONING APPARATUS

This invention relates to a control system adapted for use in an air conditioning apparatus. More particularly, the invention relates to an electronic system for controlling the performance of an air conditioning apparatus securely and imperceptibly.

In accordance with the present invention, the control system includes a hand-operated cooling switch, a hand-operated drying switch, a compressor starting timer, a temperature regulating circuit, a dehydration timer, and a fan control circuit, the temperature regulating circuit including a handoperated variable resistor to preset temperatures as desired, the ON position of the cooling switch instructing the temperature regulating circuit to control the compressor starting timer, and the ON position of the drying switch instructing the dehydration timer to control the compressor starting timer and the temperature regulating circuit.

The object of the present invention is to provide an electronic control system for an air conditioning apparatus capable of regulating the humidity and temperature precisely and imperceptibly.

Another object of the present invention is to provide an electronic control system for an air conditioning apparatus capable of withstanding a repeated use over a long period of time.

The invention will be more particularly described by reference to the preferred embodiment wherein.

Figure 1:
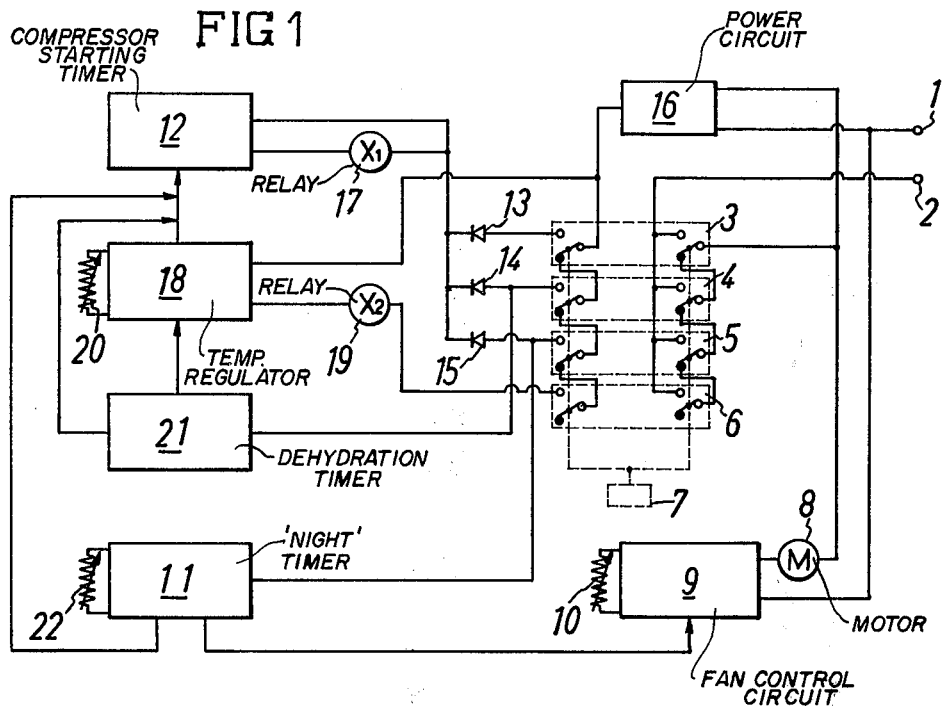
FIG. 1 is a block diagram of the control system in accordance with the present invention.
Figure 2:
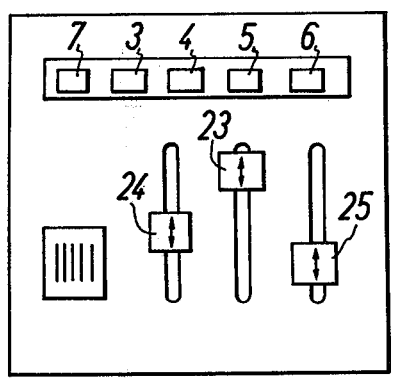
FIG. 2 is a schematic front view of the covering case containing the control system shown in FIG. 1.

Referring to FIGS. 1 and 2, the arranged circuit has a pair of terminals 1 and 2 for an A.C. power supply, and switches 3, 4, 5 and 6 are for cooling, drying, "sleep" autocutting and heating, respectively. Each switch is of the push button type having two contact points. These switches are interconnected by a known mechanism such that the priority of operation takes place in the order of the arrangement 3, 4, 5 and 6. The switches 3 to 6 have a common OFF switch 7 which, when turned on, enables the switches 3 to 6 to return to their respective OFF positions through the indicated interconnection.

A motor 8 for an electric fan is electrically connected at one side to the A.C. terminal 2 through the switches 3 to 6, and at the other side, connected to a fan control circuit 9 for regulating the rotations of a fan (not shown). The circuit 9 includes a variable resistor 10 which ensures a stepless regulation of rotation of the motor 8. In addition, this circuit is constructed such that the motor 8 can be stopped by a timer switch or commonly called "night" timer 11, which will be described in detail below.

A compressor starting timer 12 for circulating a cooling medium is energized with D.C. power by a power circuit 16 through the switches 3 to 5 and the OR circuit of diodes 13, 14 and 15, in which a relay-switch 17 for the compressor is located.

A temperature regulating circuit 18 is energized with D.C. power by the power circuit 16 without any intermediate element. This circuit is electrically connected to the heating switch 6 with the interposition of a relay-switch 19 for a heating means or a valve means connected to a hot water reservoir. In addition, the circuit includes a variable resistor 20, which ensures a stepless regulation of temperature either for cooling or heating.

A dehydration timer 21 is a cycle timer of the type which repeats "On" and "Off" at a preset interval of time, which is energized with a D.C. power by the power circuit 16 through the drying switch 4. The controlled output from this timer is delivered to the compressor starting timer 12 and the temperature regulating circuit 18, as well.

The "night" timer 11 referred to above is energized with a D.C. power by the power circuit 16 through the "sleep" auto-cutting switch 5. The controlled output from this timer 11 is delivered to the compressor starting timer 12 and the fan control circuit 9. The timer 11 is also provided with a variable resistor 22, so as to ensure a stepless control of its performance. The variable resistors 20, 21 and 22 are operated by hand, for example, by means of a lever or handle 23–25, as seen in FIG. 2.

The arrangement thus constructed is operated as follows:

The terminals 1 and 2 are connected to a supply of A.C. power, and through the power circuit 16, a D.C. current is delivered to the temperature regulating circuit 18.

When the cooling switch 3 is placed into the "On" position, cooling is started with the simultaneous operation of the fan motor 8, thereby starting the fan operation on the main air conditioning apparatus. Since the fan motor 8 is electrically connected in parallel to the switches 3, 4, 5 and 6, any of the switches when closed can start the fan operation. At the same time, the compressor starting timer 12 is energized with the D.C. current. By the action of the timer 12, the compressor is started only when the timed interval expires, except when it is initially operated. During the timed interval, the compressor is kept out of operation, in the course of which the inside gaseous pressure can reach its optimum value. This ensures that the compressor is put in operation with a balanced gaseous pressure. Before the compressor is started, the temperature regulating circuit 18 has been already energized with the D.C. current.

If a room temperature is higher than the value preset by the variable resistor 20, the temperature regulating circuit 18 maintains the compressor operative through the compressor starting timer 12 and closure of the relay 17.

When the room temperature is lower than the preset value of resistor 20, the temperature regulating circuit 18 signals the compressor through the compressor starting timer 12 to suspend its operation. The subsequent opening of relay 17 shuts off the compressor.

In this way, the rise and fall of room temperatures beyond the desired value is accurately controlled by the temperature regulating circuit so as to ensure a quick return to the preset value.

When the dehydration switch 4 is closed or in the "On" position, the air in the room is dehydrated; that is, the actuation of the cooling switch 3 is substituted by the actuation of the dehydration switch 4, thereby energizing the dehydration timer 21 with the D.C. current from the power circuit 16, while the fan motor 8 is maintained operative. This timer 21 is a cycling timer and can repeat "On" and "Off" at timed intervals. In the first cycle, a signal is given to the compressor via the compressor starting timer 12 to start its operation, which is actually effected by the closing of the relay 17. On the other hand, the compressor starting timer continues to work as a timer. At this moment, the temperature regulating circuit 18 is kept out of operation in response to the dehydration timer 21, and accordingly cooling continues irrespective of the room temperature, which is characteristic of the first "On" cycle.

In the next "Off" cycle the compressor is stopped by a signal put into the compressor starting timer 12, during which the dehydration continues with only the fan in operation. In this way, the same cycle of operation is repeated.

When the "sleep" switch 5 is placed in the "On" position, the "night" operation is started; that is, the "On" position of the drying switch 4 is substituted by the "On" position of the "sleep" switch, thereby energizing the compressor starting timer 12, the temperature regulating circuit 18 and the "sleep" timer 11 with the D.C. current from the power circuit 16.

Until the timed interval is reached by "sleep" timer 11, cooling continues as if it were operated by the cooling switch 3 as referred to above. But at the end of the timed interval, preset by the variable resistor 22, the compressor starting timer 12, and the fan control circuit 9 are shut off, thereby stopping the air conditioning unit as a whole.

When the heating switch 6 is turned on, heating is started. A relay 19 is connected to the temperature regulating circuit 18. Relay 19 can energize or de-energize a heating apparatus or a valve of a hot water reservoir. For example, if room temperature is lower than the value preset by the variable resistor, the temperature regulating circuit 18 closes relay 19, thereby energizing the heater, or, alternatively, opening the valve of a hot water reservoir. If the room temperature is raised beyond the preset value, the temperature regulating circuit opens the relay 19 so as to suspend the heating operation. In this way, the rise and fall of room temperature is kept within the optimum limits.

Figure 3:
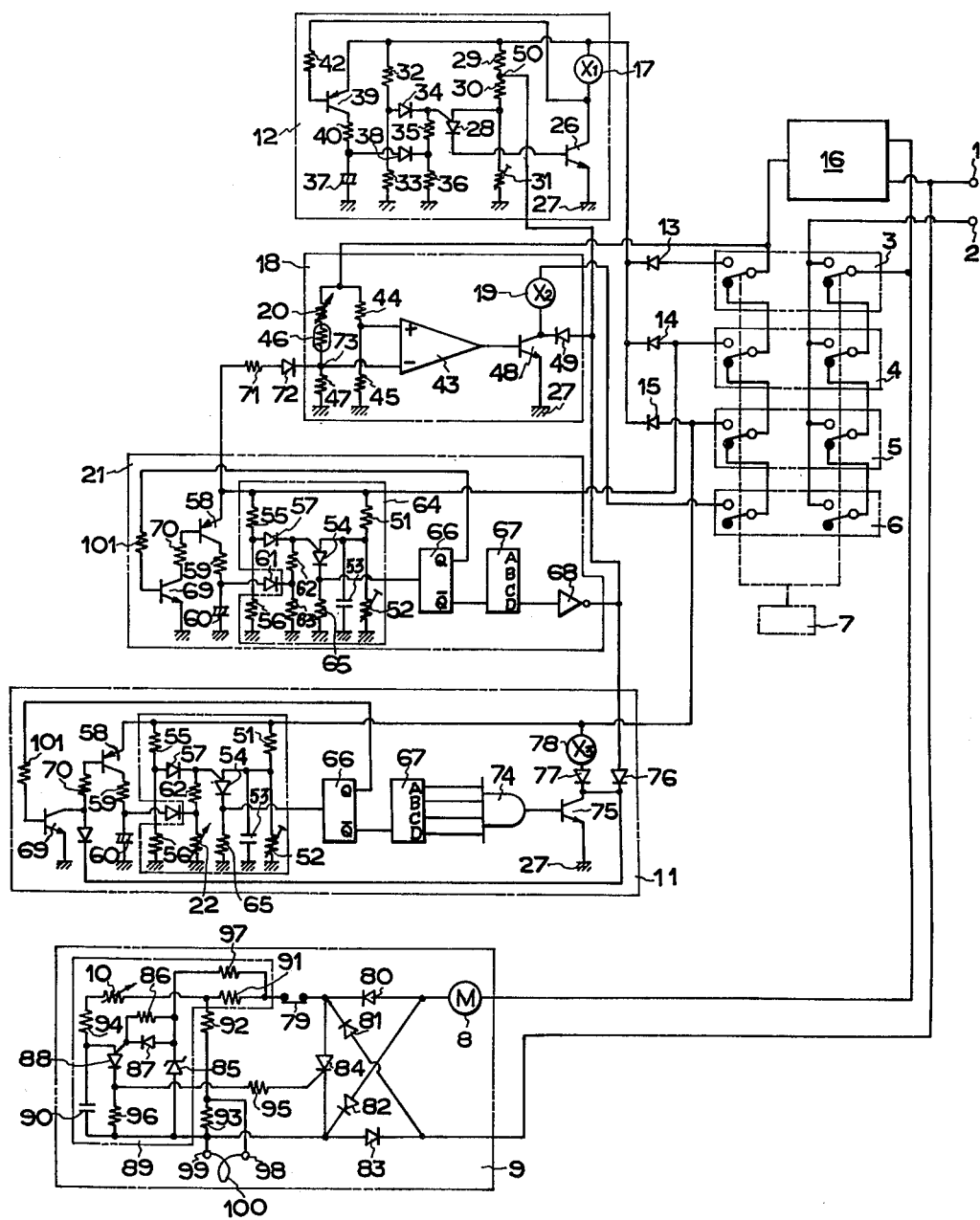
FIG. 3 is an electrical diagram of the control system shown in FIG. 1.

Referring now to FIG. 3, the electrical construction of the compressor starting timer 12, the temperature regulating circuit 18, the dehydration timer 21, the "sleep" timer 11 and the fan control circuit 9 will be described as follows:

The compressor starting timer arrangement includes the relay 17, which is connected to the collector of a transistor 26 having its emitter grounded at 27. The base of the transistor 26 is connected to the cathode of a programmable unijunction transistor 28 (hereinafter referred to as PUT).

The anode of the PUT 28 receives voltage divided by resistances 29, 30 and 31, and the gate thereof receives voltage divided by resistances 32 and 33, the divided voltage being applied through a diode 34. In addition, resistances 35 and 36 are inserted in series between the gate of PUT 28 and ground. The connection of the resistances 35 and 36 is connected to a capacitor 37 through a diode 38.

The emitter of a transistor 39 is connected to the power circuit 16 through the cooling, drying and "sleep" switches 3, 4 and 5, and the collector thereof is connected to the capacitor 37 through a resistance 40. The base of the transistor 39 is connected to the collector of the transistor 26 through a resistance 42. The resistance 31 is a variable resistor, substantially fixed, to compensate a possible error in the preset time due to manufacturing variations in each component.

The operation of the compressor starting timer arrangement is as follows:

As the total value of the resistances 35 and 36 is selected to be larger than that of the resistance 33, the gate voltage of the PUT 28 is virtually equal to the voltage divided by the resistances 32 and 33, and the anode voltage thereof is virtually equal to the voltage divided by the resistances 29, 30 and 31, provided that the capacitor 37 is not charged.

In this situation, the PUT 28 is in its ON position, with a higher voltage across the anode than the gate. Thus, when the PUT 28 is in the ON position, its base current from the cathode is delivered to the transistor 26 so as to turn on same, thereby actuating the relay 17.

When the transistor 26 is on, it supplies a base current to the transistor 39 through the resistance 42, thereby energizing same. When the transistor 39 is energized, the capacitor 37 connected to the collector thereof through the resistance 40 is charged. Impedance in charging the capacitor 37 is previously made smaller than that across the line from the capacitor to the anode of the diode 38, and accordingly, the charging voltage will be raised substantially to the level of the line voltage of the circuit 16. When the capacitor 37 is to be discharged, the switch 3, 4, 5 and 6 should be turned off by pressing the OFF switch 7, and the capacitor will be discharged thorugh the diode 38 and the resistance 36.

After the capacitor has been discharged, the re-closing of any of the switches 3, 4 or 5 causes the voltage across the capacitor 37 to apply across the gate of the PUT 28 through the diode 38 and the resistance 35. But unless the capacitor voltage drops to the level at which the anode voltage is higher than the gate voltage, the PUT 28 will not be on, whereby the OFF position of the transistor 26 is maintained with the relay 17 out of operation. At this stage, the transistor 39 is likewise kept in the OFF position with a base voltage equal to the line voltage of the power circuit 16.

In this way, the capacitor voltage continues to drop until the anode voltage exceeds the gate voltage, where the PUT 28 is energized to actuate the relay 17 through transistor 26. Transistor 39 is also turned on, thereby resuming the charging of the capacitor 37.

As evident from the foregoing, it is when the gate voltage drops below the anode voltage exceeding the off-set voltage of the PUT 28 that the PUT 28 is in the ON position; but the actual value of the gate voltage is not constant because of variations in the off-set voltage and errors in the resistances 29, 30, 31, 32 and 33. Likewise, the time for the gate voltage to reach the required value at which the PUT 28 is on is not constant because of errors in the value of the capacitor 37 and the resistance 36.

The individual errors result in an error in time, and in order to compensate for it, the variable resistor 31 is put in the anode side of the PUT 28. For example, if it takes a considerably longer time than desired, the variable resistor 31 is adjusted so as to set a higher anode voltage, whereas if it takes a relatively short time, the anode voltage is set at a lower value. In this way, the timers function precisely as preset.

The temperature regulating circuit 18 is constructed as follows:

An operational amplifier 43 has a positive input terminal connected to the line voltage of the circuit 16. The voltage is divided by resistances 44 and 45 and used as a reference voltage. The negative input terminal is delivered with the line voltage divided by the resistance of a variable resistor 20, a thermistor 46, and resistance 47. The divided line voltage applied to the negative input terminal functions as a variable against the reference voltage. The thermistor 46 is to detect temperatures in the room.

The output terminal of the operational amplifier 43 is connected to the base of a transistor 48, whose emitter is grounded at 27. Its collector is connected to the connection 50 of the resistances 29 and 30 through a diode 49, and additionally, connected to the power circuit 16 through a heating relay 19 and the heating switch 6.

The temperature regulating circuit 18 is operated as follows:

In cooling the room with cooling switch 3 in the ON position, if the temperature as measured by thermistor 46 is higher than the value preset by the variable resistor 20, the thermistor 46 will have a relatively small resistance and the variable voltage to the negative input terminal of the operational amplifier 43 is higher than the reference voltage to the positive input terminal thereof. Accordingly, the output of the operational amplifier is low, thereby maintaining the transistor 48 in the OFF position. In this situation, the compressor starting timer keeps the compressor in operation.

If the temperature becomes lower than the preset value, the resistance of the thermistor 46 will be raised, and the variable voltage to the negative input terminal of the operational amplifier 43 becomes lower than the reference voltage to the positive input terminal thereof, thereby loading the output of the operational amplifier. Thus, the transistor 48 is turned on, which acts upon the connection 50 of the resistances 29 and 30 at the anode side of the PUT 28, and the anode of PUT 28 has a lower voltage than the gate of the PUT 28. Thus, PUT 28 is turned off, and the transistors 26 and 39 are successively turned off. In this way, the relay 17 is turned off, and the compressor is stopped thereby stopping the cooling.

When the room temperature is found higher than the preset value, the same procedure will be repeated so as to resume the cooling.

In warming the room with heating switch 6 in the ON position, if the room temperature is lower than the value preset by the variable resistor 20, the thermistor has a relatively large resistance and the output of the operational amplifier 43 is high, thereby actuating relay 19 via transistor 48. Through the actuation of the relay 19, a heating means is started or a valve means is opened through the hot water reservoir. But when the room temperature is higher than the preset value, the output of the operational amplifier is made low, thereby cutting off the relay 19. Thus, the heating is discontinued.

The dehydration timer 21 is constructed as follows:

The dehydration timer 21 is connected to the power circuit 16 through the drying switch 4, which voltage is also applied to the connection 73 of the thermistor 46 and the resistance 47 in the temperature regulating circuit 18 so as to provide a de-actuating input thereto. The voltage to the dehydration timer is divided by resistances 51 and 52, and delivered to the anode of a PUT 54 through a capacitor 53.

The gate of the PUT 54 is energized by two different paths. One is a path by which a direct voltage divided by resistances 55 and 56 is delivered thereto through a diode 57, and the other is a path by which a direct voltage is delivered thereto through resistances 62 and 63 after passing through a transistor 58, a resistance 59, a capacitor 60 and a diode 61.

Reference numeral 64 denotes a relaxation oscillator in which the PUT 54 transmits pulses thorugh its cathode so as to trigger a monostable multivibrator 66. Through the resulting output Q, a pulse output is picked up, and counted by a 16 stage binary counter 67. Since the pulse output is picked up from the D output of the counter, the output is made low during the initial eight counts. Subsequently however, a high and low output are alternately repeated every eight counts. The D output of the counter is connected to the connection 50 of the resistances 29 and 30 in the compressor starting timer 12 through an inverter (NOT circuit) 68.

The transistor 58 for controlling a power delivery to the capacitor 60 receives a base current through a resistance 70 from a separate transistor 69 when the latter is energized. The transistor 69 is in turn supplied with power at its base through a resistance 101 from the Q output of the multivibrator 66. The resistance 52 is given in the form of a resistor substantially fixed for compensating errors in timed intervals due to possible variations of components. The operation is the same as the resistance 31 referred to above.

The dehydration timer is operated as follows:

When the drying switch 4 is turned on, the voltage applied to the dehydration timer 21 is delivered to the connection 73 of the thermistor 46 and the resistance 47 through the resistance 71 and the diode 72 so as to de-actuate the temperature regulating circuit 18. In particular, the output of the operational amplifier 43 in the temperature regulating circuit 18 is maintained low, thereby keeping the transistor 48 in the OFF position, thus keeping the temperature regulating circuit 18 out of operation.

At this stage, the capacitor 60 has not yet been charged, and the gate voltage of the PUT 54 keeps its value as predetermined by the selection of resistances 55 and 56. At the moment PUT 54 is energized, the relaxation oscillator 64 is actuated.

The oscillation output is led through the cathode of the PUT 54 to the trigger input of the multivibrator 66, thereby triggering same. From the $\overline{Q}$ of the multivibrator 66, a pulse output is picked up, which is counted by the binary counter 67. When the pulse output is picked up, a base current from the Q output is delivered to the transistor 69 through the resistance 101. The transistor 69 supplies a base current to the transistor 58 through the resistance 70, thereby effecting the conduction thereof. This enables its collector to charge the capacitor 60 through the resistance 59. Since it is previously determined that the resistance 63 is larger than the resistance 59, the capacitor 60 charges up to the level of the line voltage. The multivibrator 66 is actuated for a period of time required for the capacitor 60 to charge up.

When the terminal voltage of the capacitor 60 is stepped up, it is applied through the diode 61 to both ends of the discharging resistance 63, thereby stepping up the gate voltage of PUT 54 through the resistance 62. In this situation, the relaxation oscillator 64 no longer generates pulses.

The capacitor 60 is discharged through the diode 61 and 63, thereby stepping down the voltage at both ends of the resistance 63. This leads to the stepping down of the gate voltage of the PUT 54, during which the working conditions for the oscillator 64 are reached, thereby actuating same. In this way, pulses are repeatedly generated, in the course of which the capacitor is charged and discharged in cycles.

As described above, the D output of the binary counter 67 delivers low outputs during the initial eight counts of pulses from the multivibrator 66, and a high output of the inverter 68 is delivered to the connection 50 of the resistances 29 and 30. Accordingly, the compressor starting timer 12 is maintained such that the PUT 28 is energized; the relay 17 is on; and the compressor is in operation. Thus, the cooling continues irrespective of the room temperature.

The D output of the binary counter 67 delivers high outputs up to 16 counts after the initial eight counts have been counted, and with a low output of the inverter 68, the connection 50 is low. Thus, the compressor starting timer 12 has PUT 28 OFF and the relay 17 OFF, thereby suspending the compressor. The cooling is stopped irrespective of the room temperature.

After 16 counts have been counted, the binary counter 67 is returned to the zero count, and in this way the output is alternately low and high every eight counts, during which the cooling operation is suspended and resumed.

The "sleep" timer 11 is constructed as follows:

The left-hand portion of the circuit from the binary counter 67 is the same as for the dehydration timer circuit described above, except that the de-actuating input circuit including the resistance 71 and the diode 72 in the temperature regulating circuit 18 is omitted, and that the capacitor discharge resistance 63 is substituted by a variable resistor 22.

The binary counter 67 is also 16 stages, and its output terminal is connected to the base of a transistor 75 through an AND gate 74. The emitter of the transistor 75 is grounded at 27, and its collector is connected to the connection 50 of the resistances 29 and 30 through a diode 76. The collector is additionally connected to a fan stopping relay-switch 78 through a diode 77.

The "sleep" timer 11 is operated as follows:

When the "sleep" switch 5 is turned on, the binary counter 67 starts to count in the same manner as the dehydration timer 21, the counting progresses at a given interval. When it has counted 15 times, the A, B, C and D outputs become high, and the output of the AND gate 74 is made high. As a result, the transistor 75 is energized and connection 50 goes low to de-energize PUT 28 of the compressor starting timer 12, the transistor 26 and relay 17 in succession, thereby suspending the compressor. In turn, the relay 78 is energized, thereby cutting off a relay 79 in the fan control circuit 9. Thus, the fan motor 8 is stopped which results in the suspension of fan operation, and cooling is discontinued. This situation is maintained.

The fan control circuit 9 is constructed as follows:

This circuit comprises rectifiers 80, 81 82 and 83, and a silicon controlled rectifier (SCR) 84, connected to the A.C. current from the input terminals 1 and 2 for converting the A.C. to a unidirectional current to be applied to the fan motor 8.

The line voltage rectified through the rectifiers 80 and 83 is delivered, as a gate voltage, to a PUT 88 through a resistance 97 and a Zener diode 85, a resistance 86 and a diode 87, thereby enabling PUT 88 to be in phase with the line voltage.

The circuit includes a relaxation oscillator 89 having the PUT 88, whose anode receives a power supply from a capacitor 90. The capacitor 90 is charged, through a phase control variable resistor 10 and a resistance 94, with the line voltage rectified by the rectifiers 80 to 83 and additionally, divided by resistances 91, 92 and 93.

The output from the cathode of PUT 88 is delivered as a gate voltage to the silicon controlled rectifier 84 through resistances 95 and 96.

A pair of short circuit terminals 98 and 99 are led from the connection of the combined resistances 92 and 93 to the input terminal 1, and between the terminals 98 and 99, a short circuit path 100 may be provided optionally.

The operation and use of the fan control circuit is as follows:

When the fan control circuit is used at low frequency, A.C. power sources, such as 50HZ, the terminals 98 and 99 are connected by the short circuit path 100, so as to avoid a current loss, thereby keeping the potential difference at a minimum. Thus, the desired rotation of the fan is ensured.

In contrast, when the fan control circuit is used on a high frequency, such as at 60 HZ A.C. power sources, it is recommended that the terminals 98 and 99 be kept open, thereby increasing the potential difference therebetween. With the resulting rapid charging, the phase shifting is advanced.

In this way, even with a high frequency power source in which the fan motor 8 is deliberately controlled to a low speed, the R.P.M. of the fan is kept at the desired value irrespective of the insufficient power supply. Thus, the desired speed of the fan motor is ensured equally as the unit is used at a low Hertz power source.

As evident from the foregoing, the fan control circuit can be used either on a high frequency or a low frequency, simply by opening or closing the terminals 98 and 99.

I claim:

1. A control system for an air conditioning apparatus having a compressor and fan comprising:
    compressor relay means for activating the compressor,
    compressor starting timer circuit means connected to the compressor relay means for controlling the duration of operation of the compressor,
    temperature regulating circuit means connected to said compressor starting timer circuit means for controlling the compressor operation in response to a sensed temperature,
    dehydration timer circuit means connected to said temperature regulating circuit means and said compressor starting timer circuit means for controlling said compressor according to a timed cycle,
    power circuit means, and
    switch means for connecting said power circuit means to said compressor starting timer circuit means, said temperature regulating circuit means and dehydration timer circuit means.

2. A control system as recited in claim 1 further comprising:
    a fan control circuit for energizing said fan, and
    manually adjustable variable resistor means connected to said fan control circuit for controlling the fan speed.

3. A control system as recited in claim 2 further comprising:

night timer circuit means connected to said compressor starting timer circuit means and said fan control circuit for operating said compressor and fan at predetermined intervals.

4. A control system as recited in claim 2 wherein said fan control circuit comprises:
a silicon controlled rectifier,
a relaxation oscillator having a programmable unijunction transistor (PUT) connected to said silicon controlled rectifier for controlling the firing phase angle thereof, said silicon controlled rectifier connected to said power circuit means,
resistance means connected to said relaxation oscillator,
terminal means connected to bypass said resistance means for establishing a short circuit therebetween,
whereby said fan control circuit is operative at high and low frequencies of said power source.

5. A control system as recited in claim 1 wherein said apparatus comprises a heater and said control system further comprises:
heater relay means for activating said heater, said heater relay means connected to said temperature regulating circuit means, and
heater switch means for connecting said heater relay means and said temperature regulating circuit means to said power source.

6. A control system as recited in claim 5 further comprising a master switch for simultaneously turning off said switch means and said heater switch means.

7. A control system as recited in claim 1 wherein said compressor starting timer circuit means comprises:
a programmable unijunction transistor (PUT) having a gate, anode and cathode,
capacitor means connected to the gate of said PUT for controlling the turning on and off of said PUT, and
said compressor relay means controlled by said PUT.

8. A control system as recited in claim 1 wherein said dehydration timer circuit means comprises:
a relaxation oscillator having a programmable unijunction transistor (PUT),
compacitor means coupled to a gate of said PUT,
monostable multivibrator means connected to said PUT and having output pulses triggered by said relaxation oscillator,
means for connecting said output pulses to said capacitor means for charging same, and
said compacitor means discharging to render said PUT conductive.

* * * * *